Oct. 18, 1966 K. F. RUSSELL 3,279,423
FRUIT TREATING APPARATUS AND CONTROL MEANS THEREFOR
Filed June 26, 1963 3 Sheets-Sheet 1

INVENTOR.
KENNETH F. RUSSELL
BY
Miketta and Glenny
ATTORNEYS.

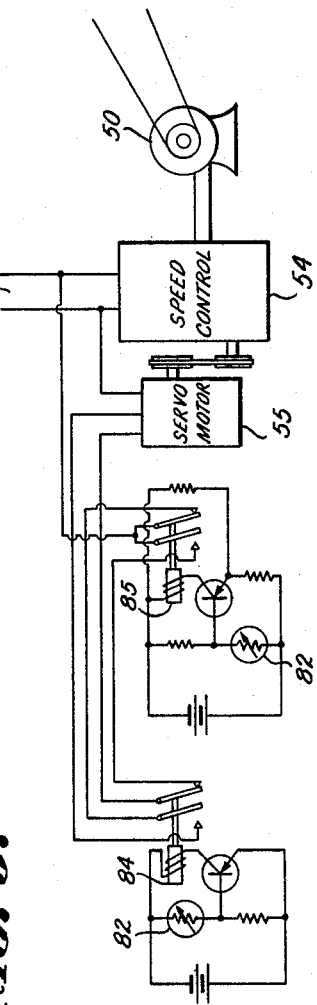

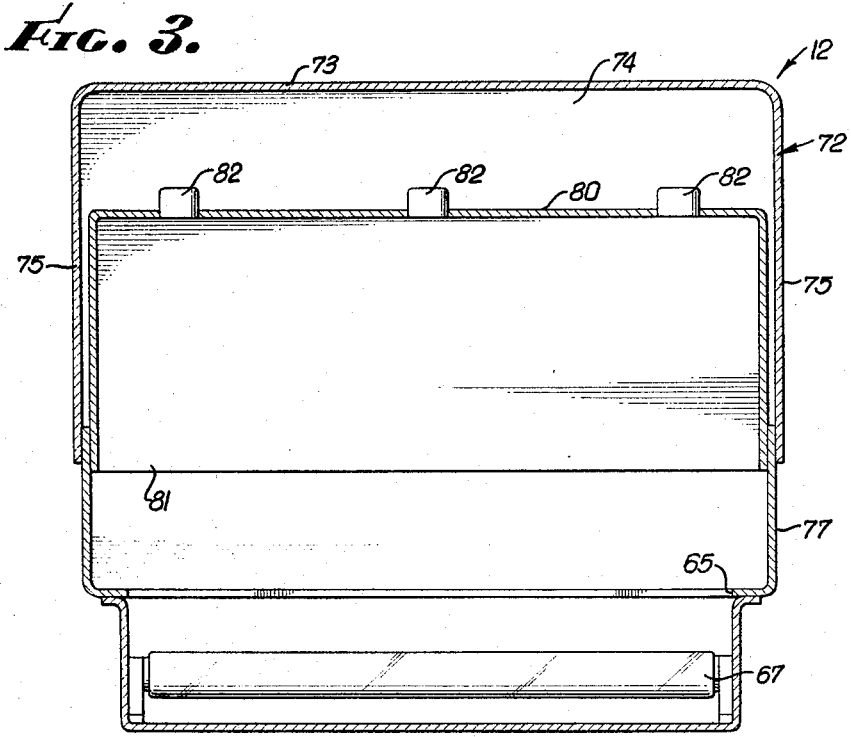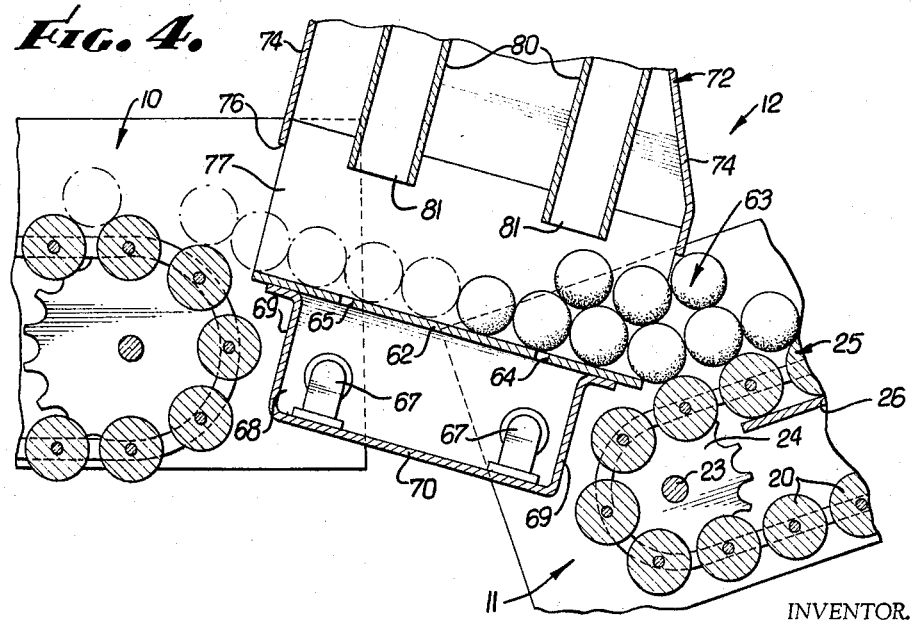

United States Patent Office 3,279,423
Patented Oct. 18, 1966

3,279,423
FRUIT TREATING APPARATUS AND CONTROL MEANS THEREFOR
Kenneth F. Russell, Claremont, Calif., assignor to Brogdex Company, Pomona, Calif., a corporation of California
Filed June 26, 1963, Ser. No. 290,762
11 Claims. (Cl. 118—6)

This invention relates to fruit treating apparatus and to a flow control means for discrete articles, such as fruit or the like, and more particularly to control means responsive to variations in number of articles supplied thereto for delivering a virtually uniform selected quantity of such articles to an article treating zone.

The present invention relates particularly to such a control or regulating means for use in the processing of discrete articles such as citrus fruit, that is, lemons, oranges and grapefruit. In the treatment of such fruit it is desirable to enhance the appearance and preservation of the fruit by applying to fruit surfaces a coating of a selected wax emulsion or composition material. A treating zone may be provided for application of such wax composition to fruit surfaces and may include a roll conveyor for agitating the fruit as it passes through the zone so that all surfaces of the fruit are exposed to a spray of the wax material. It is desirable that such treating zone conveyor be completely filled with fruit in order to more effectively and efficiently treat quantities of fruit. Non-uniform distribution of fruit in the treating zone or utilization of only 50% of the capacity of the treating zone conveyor while spraying wax material in quantities based upon full capacity will substantially add to costs of operation and such processing of fruit will not be efficiently and effectively performed.

The present invention contemplates a control or regulating means for such fruit so that the treating zone conveyor will be virtually always filled with fruit during operation. A virtually uniform fruit surface area will be presented to the treating zone, and a desired quantity and concentration of wax composition will be sprayed into said zone in proportion to fruit fed to the treating zone to properly coat such aggregate fruit surface area. The control means contemplated by this invention from its feeding and reception of fruit in a noncontinuous manner or at varying rates of flow and the delivering of the fruit to a treating zone in a continuous manner or at virtually the same average rate of flow at which the fruit is received. Thus, the control means virtually eliminates the effect of feeding fruit in surges in which heavy fruit density occurs.

Generally speaking, the present invention contemplates a flow control or regulating means for discrete articles, including an accumulation zone to receive fruit and light responsive means at said zone to determine whether the accumulated fruit is sufficient to quantity to completely fill a conveyor in a treating zone. The invention contemplates that if the accumulation of fruit is insufficient, the light responsive means will cause actuation of means whereby the speed of the elevator or feed conveyor and zone conveyor will be decreased in order that the desired uniform amount of fruit can be picked up by the feed conveyor and delivered to the zone conveyor. In the event the accumulation of fruit is too great, the light responsive means will cause the speed of the feed conveyor to increase so that uniform distribution of fruit on the feed conveyor and in the treating zone can be mantained. The invention contemplates that in the event an insufficient quantity of fruit should actually be delivered to the treating zone that the quantity of wax composition sprayed at that zone will be accordingly decreased.

A primary object of the present invention is to describe and provide a flow control or regulating means for discrete articles entering a treating zone.

An object of the invention is to provide a flow control means for discrete articles wherein the discrete articles are received in random quantities and wherein the discrete articles are delivered from the flow control means in substantially uniform quantity.

Still another object of the invention is to disclose and provide such a flow control means wherein means are responsive to a quantity of fruit and wherein such response is correlated with the delivery speed of a feed conveyor to a treating zone conveyor.

A further object of the invention is to disclose and provide light responsive means sensitive to an accumulation of a quantity of fruit and means associated therewith for increasing or decreasing the speed of a feed conveyor and treating zone conveyor so that the latter conveyor will be substantially full; the invention also contemplating such system wherein the amount of wax delivered to the treating zone will be correlated to the speed of the conveyors.

Various other objects and advantages of the present invention will be readily apparent from the following description of the drawings in which an exemplary embodiment of the invention is shown.

In the drawings:

FIG. 2 is a top plan view of FIG. 1 with cover members removed.

FIG. 3 is a fragmentary transverse sectional view taken in the plane indicated by line III—III of FIG. 1.

FIG. 4 is an enlarged longitudinal sectional view taken in the same plane as the sectional view of FIG. 1.

FIG. 5 is an exemplary circuit diagram for use with flow control means shown in FIG. 1.

Figure 1:
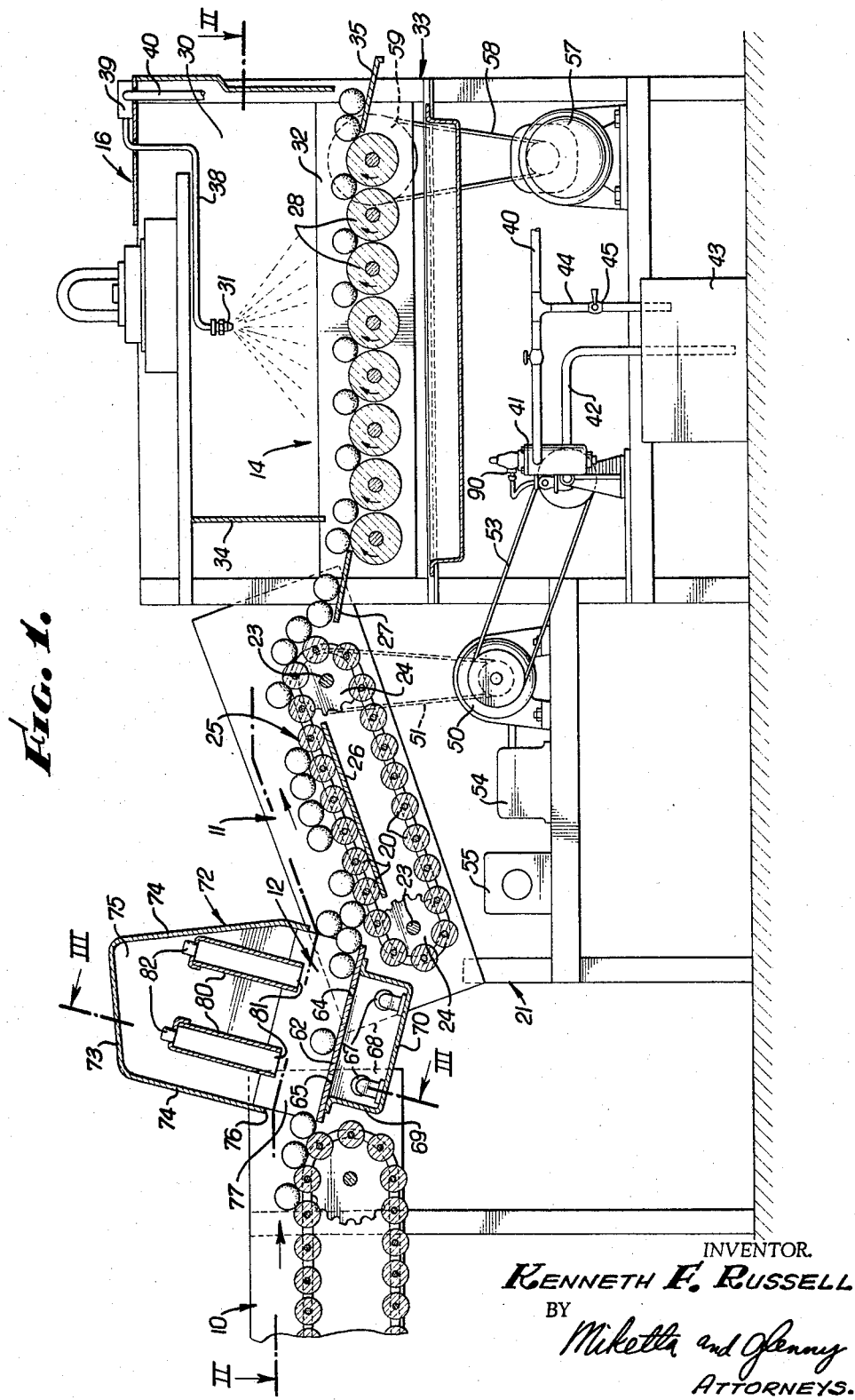
FIG. 1 is a fragmentary longitudinal sectional view of a fruit treating apparatus embodying the present invention.

In the drawings, a fruit treating apparatus embodying the present invention may include a transport conveyor means 10 defining a flow path for fruit, a feed conveyor means 11 connected with transport conveyor means 10 by an intermediate delivery means 12, and a treating zone conveyor means 14 located in spray chamber 15 of fruit treating and spraying apparatus 16. It will be understood that while the present invention exemplarily employs fruit treating apparatus that other discrete articles may be used with the apparatus of this invention in order to provide a means for receiving such discrete articles in random fashion and then accumulating and finally delivering such articles in a substantially uniform supply or quantity whereby the treating zone conveyor means 14 will be virtually completely filled during operation of apparatus 16. In the present example, the fruit to be treated may include various types of citrus fruit such as lemons, oranges and grapefruit having fruit surface area which are desired to be coated or covered with selected sprayable wax emulsions or compositions as are well known in the fruit processing industry.

In detail, the fruit transport conveyor means 10 may receive fruit in quantity from a supply source, not shown which may consist of boxes used to temporarily store the fruit. The fruit transport means may include a belt-type or a roll-type conveyor adapted to advance fruit therealong at a selected rate of speed, the fruit being arranged thereon in any random fashion. Thus it will be understood that fruit discharged onto the delivery means 12 may include at any one instance only a few fruit or a great many fruit. The transport conveyer means 10 is not described in great detail because such is well known in the art and any suitable conveyor may be employed.

The feed conveyor means 11 serves to orient fruit delivered to it by delivery means 12 and for this purpose may include a plurality of parallel rolls 20 arranged in endless fashion and supported by a suitable frame structure 21 including parallel side members 22 upon which may be mounted end shafts 23. Shafts 23 may support end sprockets 24 which may engage suitable means carried on the ends of rollers 20 for guiding and moving said rollers about ends of conveyor means 11. The top lay 25 of rolls 20 may frictionally engage a longitudinally extending member 26 to cause the rolls 20 to rotate in a selected direction and to assist in rapid distribution of fruit in rolls of top lay 25. The top lay 25 may be inclined upwardly and, at its top, fruit may be discharged across a flat, downwardly inclined, delivery member 27 to parallel rolls 28 of zone conveyer 14.

Each zone conveyor roll 28 may be rotatably driven for agitating and turning fruit carried by adjacent rolls so as to present all of the fruit surfaces towards the top of the treating chamber 30 for exposure to finely divided particles of wax composition material introduced into chamber 30 through one or more spray nozzles 31. The zone conveyor 14 may be of suitable type and rotatably driven rolls 28 may be supported from side frame members 32 carried by suitable frame structure generally indicated at 33. The chamber 30 may be substantially enclosed and may include a front baffle 34. Fruit transported by rolls 28 through the treating chamber 30 may be discharged over a downwardly inclined plate 35 to suitable conveyer means for transporting the fruit to any desired location.

The spray nozzle 31 may be connected by a suitable hose 38 to a solenoid operated valve 39 connected by hose 40 to a suitable pump means 41 connected through intake hose 42 to a tank or other suitable source 43 of wax composition material in liquid form. A bypass pipe 44 is connected to hose 40 and to tank 43, said bypass pipe 44 being provided with a needle valve 45 for the purpose later described.

Means for driving the feed conveyor means 11 may include a motor means 50 having a suitable drive connection 51 to one of the end shafts 23 on the conveyor means 11. The motor means 50 is also connected through suitable drive means 53 to pump means 41. The motor means 50 is preferably a variable speed motor connected in usual manner to a speed control means 54 operably connected to a servo motor 55 for a purpose later described.

Drive means for the treating zone conveyor 14 may include a motor means 57 carried by a frame means 33, the motor shaft of motor means 57 being connected by suitable drive means 58 to a sprocket and shaft means 59 on conveyor 14 which is operably connected to each roll 28 for rotating rolls 28 at a selected speed of rotation. The drive means may be any suitable well known form of drive. Motor means 57 may similarly be a variable speed motor so that the speed of rotation of rolls 28 of treating zone conveyor 14 may be suitably correlated with the rate of flow of fruit at the elevator feed conveyor.

The present invention is particularly concerned with the means by which fruit delivered in varying flow rates is converted to fruit delivered to the feed conveyor at substantially uniform rates of flow. For this purpose, it will be noted that delivery means 12 includes a downwardly inclined, transverse member 62 forming with the upwardly inclined top lay 25 of feed conveyor 11, a transverse depression indicated at 63. The transverse member 62 is provided with a bottom transversely extending slot 64 which extends the entire width of the path of fruit delivered by transport conveyor 10. Spaced above and distal to depression 63 is a second slot 65 extending transversely across member 62. Below each slot 64 and 65 is provided a transversely extending light source 67 of suitable type, light source 67 being suitably mounted and carried in a chamber 68 defined by side and bottom walls 69 and 70 of a light source housing. Side walls 69 may be connected to member 62 by suitable angle brackets. Above transverse member 62 is provided a transversely extending housing 72 having a top wall 73, side walls 74 and end walls 75 defining a bottom opening 76 spaced above member 62 a suitable selected distance. End walls 75 may be connected to end extensions 77 terminating at transverse member 62. Within housing 72 are provided a pair of transversely extending light receiving housings 80, each aligned above its associated slot 64 or 65 and each having an open bottom end 81 adapted to receive and pass light from a light source 67 upwardly to light sensitive or responsive means or devices 82, such as photoconductive cells. Internal surfaces of light housings 80 may be suitably coated adjacent their bottom with black non-reflective coatings and above said black coatings with light reflective coatings, such as aluminum or the like. The purpose of the black coatings is to eliminate the presence of any stray light reflection into the upper portions of light housings 80 and to the light sensitive photocells 82.

The photoconductive cells 82 are suitably electrically connected with a relay means 84 at servo motor 55 for actuation of the servo motor means. The photoconductive cells 82 are of the type wherein their resistance varies directly with the amount or quantity of light received. The amount of light will vary depending upon the accumulation or build-up along transverse member 62 of fruit which partially and almost entirely covers one or both slots 64, 65. Photoconductive cells 82 may be included in a circuit (FIG. 5) whereby relay means 84 will be actuated only when a certain amount or quantity of light is received by photocell 82 from its associated light soure 67. Likewise, the other photocell 82 will receive a certain variable amount of light from its associated light source so that when it receives a selected amount of light, the resistance thereof will be such that relay 85 in FIG. 5 will be actuated. Thus, servo motor 55 associated with the relays 84 and 85 will be actuated in accordance with the amout of light received by photoconductive cells 82 as more particulary described hereafter in operation of the apparatus.

In the present example, inclination of the top lay 25 of feed conveyor 11 is approximately 18° whereas the inclination of the transverse member 62 is approximately 20° or slightly steeper. Thus, fruit accumulated in the depression 63 formed by such included angle, will tend to accumulate along member 62 while fruit at the bottom of the depression are picked up by the rolls 20 of the top lay 25 and conveyed upwardly.

In operation of the fruit treating apparatus described above, it will be understood that fruit in random irregular arrangement and at varying flow rates are transported by conveyor 10 to the delivery means 12 for transfer to feed or elevator conveyor 11 and thence to the treating zone conveyor 14 which is desired to be maintained in a uniform, full condition with fruit. Generally as fruit is delivered across transverse member 62 into transverse depression 63, fruit will begin to accumulate, pile up, or tend to fill this depression. The amount of accumulation of fruit depends upon the rate of flow of fruit delivered to the accumulation zone and the rate of flow of fruit taken away from the accumulation zone. The height of the accumulated fruit in the depression 63 determines the rate of flow of fruit away from the accumulation zone and discharged on conveyor 11. The treating zone conveyor rolls 28 are rotated at a selected rate of speed and it will be understood that in the treating zone fruit is first delivered to the first valley defined by the first roll 28 and delivery member 27 and then additional fruit flowing down the delivery member 27 forces this fruit out of the first valley into the second valley as defined by adjacent rolls 28. Since rolls 28 are revolving they assist in the advancement of the fruit while turning and agitating the fruit so that all surfaces of the fruit are exposed to the spray material. It will be understood that the speed of rotation of the conveyor rolls may be varied if desired.

In detail, fruit is delivered at varying flow rates across transverse member 62 into depression 63 and accumulates therein. Feed conveyor 11 is operating at a preset minimum speed since at the commencement of a run both slots 64 and 65 are open, unobstructed by fruit, and the servo motor 55 is thus actuated to cause motor 50 to operate conveyor 11 at minimum speed. As fruit accumulates and covers the lowermost slot 64, no change occurs in the speed of conveyor 11. When the fruit accumulates and covers a predetermined area of the second uppermost slot 65 the servo motor 55 is actuated to cause increase in the speed of conveyor 11 until slot 65 is uncovered. When a preselected area of slot 65 is uncovered and such condition is sensed by the photoconductive cell 82 thereabove, the servo motor 55 is caused to stop and the motor 50 continues to operate at the speed of the elevator or feed conveyor 11 at the time of uncovering slot 65.

Under such conditions with the rate of fruit flow being sufficient to maintain the depression 63 with an accumulation of fruit covering slot 64, the feed conveyor 11 will be filled and will advance fruit to the conveyor rolls 28 so that the valleys between the conveyor rolls are filled as fruit is advanced through the treating zone. When the flow rate of fruit is decreased so that the accumulated fruit uncovers lowermost slot 64 to a preselected amount the photoresponsive cell 82 thereabove senses this condition and commands the servo motor 55 to again be actuated and to decrease the speed of motor 50 to cause the feed conveyor 11 to reduce its speed until the fruit has again accumulated sufficiently to cover lowermost slot 64. When slot 64 is thus covered, the photoresponsive cell 82 thereabove detects this condition and causes the servo motor 55 to again stop and to permit the speed of conveyor 11 to remain at the corresponding value or speed at which it was operating at the time of detection of the above condition. Thus, conveyor 11 is operated at a slower reduced speed until either of the slots 64, 65 is covered or uncovered depending upon the rate of flow of fruit to the accumulation zone or depression 63.

The control of the flow of fruit by the means above described provides a full elevator or feed conveyor 11 and and a full conveyor 14.

Since the feed conveyor speed may change during operation of the apparatus above described, it will be readily apparent that the amount of wax spray or other sprayable fruit treating material to be introduced into the spray chamber should be varied in order to avoid overcoating or undercoating said fruit with wax. When the accumulated fruit at depression 63 indicates a change in speed of zone conveyor 14 the amount of material supplied to the spray nozzle will likewise be varied. For this purpose, pump means 41 is driven by drive means 53 from the variable drive motor 50. The pump 41 is initially operable with its relief valve 90 set above maximum pressure that will be required to provide a desired amount of sprayable liquid to the nozzle under maximum conditions. Bypass needle valve 45 is then adjusted to obtain a desired flow of liquid spray material through nozzle 31 at the preselected speed of the conveyor 14. When the variable drive motor 50 increases the speed of feed conveyor 11, pump 41 is driven at a likewise proportionately increased speed to deliver to nozzle 31 a greater quantity of sprayable material. Similarly, when the accumulation of fruit at depression 63 causes a decrease in the speed of feed conveyor 11, the pump 41 will operate at a decreased speed and the quantity of wax material delivered to nozzle 31 will be decreased proportionately.

It will be understood that at initial starting of the apparatus that the spray material will not be introduced into the spray chamber until fruit have actually arrived in the chamber. Manual or suitable sensing means may be employed to detect the presence of fruit at a selected location on the delivery means 27 and to start spraying of wax material within the spray chamber.

It will thus be apparent that control and regulation of the sprayable material is directly related to the speed of conveyor 11 and amount of sprayable material is directly proportional to the total surface area of a predetermined quantity of fruit passing through the spray chamber. In the event there are variations in the fruit surface area because of different size of fruit passing through the spray chamber, an adjustment of the needle valve 45 may be made in order to compensate for such increased or decreased fruit surface area even though the entire treating zone conveyor is filled with fruit as desired.

It will thus be understood by those skilled in the art that a novel control means for regulating the quantity of fruit delivered to a treating zone has been provided by the above described apparatus. It will be apparent that when articles other than fruit are subjected to such control means that some variations may be required in the spacing apart of the slots 64 and 65 in order to provide the desired rate of flow of fruit onto conveyor 14. It may also be apparent that with different kinds, sizes and types of articles introduced to the flow control means that the depression may be formed with a larger or smaller included angle between the top lay 25 and the delivery member 62. While the example of the invention shown above is described with respect to a wax spraying chamber, it will be understood that it may be desirable to have a full conveyor for other purposes and the present invention is not intended to be limited to the specific embodiment described.

Various changes and modifications may be made in the apparatus described above and in the means for controlling flow of articles or fruit thereby and which may come within the spirit of the invention and all such changes and modifications coming within the scope of the appended claims are embraced thereby.

I claim:

1. In an apparatus for treating fruit, the combination of: a transport conveyor means adapted to receive and convey fruit in random arrangement; inclined means for receiving the discharge of said random fruit from said transport conveyor means; inclined feed conveyor means providing with said inclined discharge means a depression adapted to accumulate said fruit; a treating zone conveyor means adapted to receive fruit from said feed conveyor means; means at said depression responsive to the accumulation of fruit therein; means for driving said feed conveyor means at variable speeds; means for driving said zone conveyor means; said means for driving the feed conveyor means being cooperably connected with said responsive means for varying speed of the feed conveyor means in accordance with the amount of fruit accumulated at said depression for supplying a sufficient quantity of fruit to said zone conveyor means to fill said zone conveyor means.

2. An apparatus as stated in claim 1 wherein said responsive means includes transversely arranged, longitudinally spaced, light responsive devices for determining at least two spaced locations of accumulated fruit.

3. An apparatus as stated in claim 2 including means for decreasing speed of said feed conveyor means when only one of said light responsive devices detects the accumulation of fruit at one of said locations.

4. An apparatus as stated in claim 3 including means cooperable with said light responsive devices and said drive means whereby detection of accumulation of fruit at both of said locations will increase speed of said feed conveyor means.

5. An apparatus as stated in claim 1 including a source of sprayable wax composition; a pump means connected with said source and with the treating zone; and means connecting said pump means with said feed conveyor drive means whereby the quantity of wax composition sprayed in said treating zone varies in accordance with the speed of the feed conveyor means.

6. In combination with a fruit treating apparatus having a transport conveyor means, a feed conveyor means for delivering fruit to a treating zone, and a means for conveying fruit between said transport conveyor means and said feed conveyor, the provision of: means providing accumulation of fruit at said intermediate conveyor and including a downwardly inclined, transverse member forming with said feed conveyor a transversely extending depression; said inclined member having transversely extending parallel spaced slots; light responsive means associated with each slot; variable drive means for said feed conveyor; and means operably connecting said light responsive means to said variable drive means to vary the speed of said feed conveyor in accordance with accumulation of fruit on said transverse member as sensed by said light responsive means.

7. An apparatus as stated in claim 6 wherein one of said slots is proximate to the bottom of said depression.

8. An apparatus as stated in claim 6 wherein one of said slots is proximate to the upper end of said inclined member.

9. An apparatus as stated in claim 6 wherein each light responsive means includes a light source below its associated slot, a photoconductive cell above said associated slot to receive light from said light source, said photoconductive cell being responsive only when a preselected area of said slot is covered by accumulated fruit.

10. Control means for regulating the quantity of fruit delivered to a treating zone conveyor means moving at a selected speed for maintaining said zone conveyor means virtually completely full of fruit comprising in combination: a feed conveyor means for said zone conveyor means; a transport conveyor for moving fruit at random along a path to said feed conveyor; a delivery means for said transport conveyor to said feed conveyor; said delivery means and feed conveyor being arranged to provide for accumulation of fruit as fruit is delivered to said feed conveyor; means responsive to accumulation of at least two quantities of fruit; variable drive means for said feed conveyor cooperably connected with said responsive means for varying the speed of said feed conveyor; means for supplying a selected amount of wax composition to a treating zone at said treating zone conveyor; and means interconnecting said variable drive means and said wax supplying means whereby the quantity of wax supplied to said treating zone varies in accordance with the speed of said feed conveyor as regulated by said responsive means.

11. In an apparatus for treating fruit, the combination of: a conveyor means for feeding fruit to a treating zone; means for delivering fruit to said feed conveyor means; a treating zone conveyor means for receiving fruit from said feed conveyor means; means to control the speed of the feed conveyor means to deliver a selected quantity of fruit to the treating zone conveyor means and comprising means including a depression accumulating fruit adjacent one end of said feed conveyor means, and means responsive to such accumulation of at least two quantities of fruit; means for driving said feed conveyor means at variable speeds; said means for driving the feed conveyor means being cooperably connected with said responsive means for varying speed of the feed conveyor means in accordance with the amount of fruit at said fruit accumulating means for supplying a sufficient quantity of fruit to said treating zone conveyor means to fill said zone conveyor means.

References Cited by the Examiner

UNITED STATES PATENTS

| | | | |
|---|---|---|---|
| 2,384,702 | 9/1945 | Sells et al. | |
| 2,662,633 | 12/1953 | Kinksley | 198—37 |
| 2,961,085 | 11/1960 | Stovall | 198—37 |
| 3,147,883 | 9/1964 | Jakobson | 198—37 |
| 3,164,857 | 1/1965 | Sennello | 198—37 X |

DANIEL BLUM, *Primary Examiner.*